(12) United States Patent
Li et al.

(10) Patent No.: US 12,290,851 B2
(45) Date of Patent: May 6, 2025

(54) ELECTRICALLY ASSISTED FORMING PROCESS AND DEVICE FOR HIGH-STRENGTH METAL ALLOY THIN-WALLED PIPE

(71) Applicants: CENTRAL IRON AND STEEL RESEARCH INSTITUTE, Beijing (CN); YANSHAN UNIVERSITY, Qinhuangdao (CN)

(72) Inventors: Yong Li, Beijing (CN); Zhiqing Lyu, Qinhuangdao (CN); Bo Zhao, Beijing (CN); Chunxu Wang, Beijing (CN); Shun Han, Beijing (CN); Le Zhan, Qinhuangdao (CN); Jianxiong Liang, Beijing (CN); Zhenbao Liu, Beijing (CN); Changjun Wang, Beijing (CN)

(73) Assignees: CENTRAL IRON AND STEEL RESEARCH INSTITUTE, Beijing (CN); YANSHAN UNIVERSITY, Hebei (CN)

(*) Notice: Subject to any disclaimer, the term of this patent is extended or adjusted under 35 U.S.C. 154(b) by 792 days.

(21) Appl. No.: 17/570,898

(22) Filed: Jan. 7, 2022

(65) Prior Publication Data
US 2022/0347733 A1 Nov. 3, 2022

(30) Foreign Application Priority Data
Apr. 29, 2021 (CN) .......................... 202110472436.0

(51) Int. Cl.
*B21D 9/15* (2006.01)

(52) U.S. Cl.
CPC ..................................... *B21D 9/15* (2013.01)

(58) Field of Classification Search
CPC ....... B21C 37/00; B21C 37/042; B21C 37/06; B21C 37/0807; B21C 37/0818; B21C 9/00; B21C 1/00; B21C 1/02; B21C 1/04; B21C 1/16; B21D 9/15; B21D 37/16; B21D 31/00; B21D 31/005; B21L 11/005; Y02P 10/20

See application file for complete search history.

*Primary Examiner* — Hung D Nguyen
(74) *Attorney, Agent, or Firm* — Holtz, Holtz & Volek PC

(57) ABSTRACT

An electrically assisted forming process and device for a high-strength metal alloy thin-walled pipe includes a die sleeve, wiring terminals, a pulse power supply, a die seat, sealing baffle plates, a drawing die, and a cooling water circulation chamber. A process for forming a high-strength metal alloy thin-walled pipe includes first, graphite or fusible metal, i.e., an aluminum rod, is introduced into a high-strength metal alloy pipe to be drawn to fill the whole pipe; and then, pulse current is introduced into a plastic deformation area of the thin-walled pipe. A cooling device can be provided to achieve a good cooling effect. The thin-walled pipe with corresponding length is cut according to a production requirement after processing is completed, and annealing treatment is performed in a vacuum heat treatment furnace.

8 Claims, 2 Drawing Sheets

ELECTRICALLY ASSISTED FORMING PROCESS AND DEVICE FOR HIGH-STRENGTH METAL ALLOY THIN-WALLED PIPE

CROSS REFERENCE TO RELATED APPLICATION

This patent application claims the benefit and priority of Chinese Patent Application No. 202110472436.0 filed on Apr. 29, 2021, the disclosure of which is incorporated by reference herein in its entirety as part of the present application.

TECHNICAL FIELD

The present disclosure relates to the technical field of pipe forming, and in particular, to an electrically assisted forming process and device for a high-strength metal alloy thin-walled pipe.

BACKGROUND ART

Drawing forming refers to a plastic processing method that metal passes through a die with a tapered hole to reduce the sectional area. Various wire rods and pipes with different sections can be processed through drawing forming, with high precision and high surface quality, and without material waste. In the current era focusing on resource-conserving development, the drawing technology has received increasing attention In the current pipe forming process, for some metals with low plasticity and high work hardening capacity, cracks and even tensile fracture easily occur when a deformation amount is large. Electric current is introduced into a plastic forming process of a material, so that the forming force of the material can be effectively reduced, the microstructure and the mechanical property of the material can be remarkably improved, which has remarkable advantages compared with a traditional pipe forming process, and provides a promising solution for the problem of a difficult-to-deform material being hard to process. At present, electrically assisted forming processes has been applied to drawing forming. However, most of them are electrically assisted drawing processes for wires, and there are few researches on electrically assisted drawing processes for pipes. Therefore, it is urgent to develop an electrically assisted drawing process for a thin-walled high-strength metal alloy pipe for research.

SUMMARY

An objective of the present disclosure is to provide an electrically assisted forming process and device for a high-strength metal alloy thin-walled pipe to solve the abovementioned problems in the prior art. The high-strength metal alloy thin-walled pipe is subjected to multi-pass drawing by using electro-plastic forming, which improve the production efficiency and solves the problem about the serious work hardening of the high-strength metal alloy thin-walled pipe. The production cost is effectively reduced by fusible metal recovered during annealing, so the economic efficiency is higher.

To achieve the abovementioned objective, the present disclosure provides the following solutions:

The present disclosure provides an electrically assisted forming process for a high-strength metal alloy thin-walled pipe, including the following steps:

selecting drawing dies with corresponding hole diameters in sequence, i.e., selecting the drawing dies with $\Phi_1$, $\Phi_2, \Phi_3, \ldots, \Phi_n$ according to an outer diameter $\Phi_0$ of a high-strength metal alloy pipe to be drawn and an outer diameter $\Phi_{target}$ of a target high-strength metal alloy pipe, where $\Phi_{target}=\Phi_n$ (n>5);

placing low-melting point metal filler into the high-strength metal alloy pipe to be drawn, where the low-inciting point metal filler is in clearance fit with the high-strength metal alloy pipe to be drawn, and a gap between the low-melting point metal filler and the high-strength metal alloy pipe to be drawn is filled with graphite powder;

turning on a pulse power supply which has current magnitude, duty cycle, and frequency set as required; feeding the high-strength metal alloy pipe to be drawn into the drawing dies; driving, by a horizontal rightward pulling force, the high-strength metal alloy pipe to be drawn to be conveyed from left and right at a constant speed such that the high-strength metal alloy pipe experiences an electroplastic drawing, a cooling device being arranged between every two passes, the high-strength metal alloy pipe is drawn for more than 5 passes, the total processing rate of drawing is greater than 50%, the inner diameter is reduced by 20% to 70%, the outer diameter is reduced by 40% to 90%, and the wall thickness is thinned by 60% to 95%; turning off the pulse power supply after the drawing is completed to obtain the high-strength metal alloy thin-walled pipe; and cutting, from the high-strength metal alloy thin-walled pipe, a thin-walled pipe segment with corresponding length as required after the drawing is completed, and vertically placing the thin-wall pipe segment in a vacuum heat treatment furnace for annealing treatment, during which the low-melting point metal filler in the thin-walled pipe segment is melted and flows into a groove of the vacuum heat treatment furnace under an action of gravity, for recycling and the target high-strength metal alloy thin-walled pipe is obtained.

In some embodiments, the duty cycle of the pulse power supply is set as 20% to 90%, the frequency is set as 100 HZ to 1000 HZ, and the current magnitude is set as 30 A to 1000 A.

In some embodiments, the annealing treatment is performed at a temperature of 300° C. to 900° C., for a the annealing time of 0.5 to 5 hours, and air cooling is performed after the annealing treatment.

In some embodiments, the low-melting-point metal filler is pure aluminum or aluminum alloy.

In some embodiments, the vacuum heart treatment furnace includes a furnace wall. A groove with an opening at its top is formed in the inner bottom of the furnace wall. A transverse frame is provided above the groove. The transverse frame is used for uniformly and vertically placing the thin-walled pipes segment to be subjected to annealing treatment.

The present disclosure further provides an electrically assisted forming device for a high-strength metal alloy thin-walled pipe, including a drawing die. The inner diameter of the drawing die is gradually reduced from left to right. Two ends of the drawing die are fixedly connected to die seats. The die seats include a first die seat and a second die seat. The inner diameter of the first die seat is the same as the inner diameter of the left part of the drawing die. The inner diameter of the second die seat is the same as the inner diameter of the right part of the drawing die. The first die seal and the second die seat are respectively connected to two wiring terminals. The two wiring terminals are respectively connected to a positive electrode and a negative electrode of the pulse power supply. The drawing die is externally covered with the die seats. The two ends of the die seat are respectively and fixedly connected to the first die seat and the second die seat. A cooling water circulation chamber is embedded into the die seat. Sealing baffle plates are provided at two ends of the cooling water circulation chamber, and are fixed to the drawing die by bolts.

In some embodiments, the upper end of the cooling water circulation chamber is connected to a water inlet passing through the die seat. The lower end of the cooling water circulation chamber is connected to a water outlet passing through the die seat. The water inlet and the water outlet are respectively and externally connected to a circulating cold water tank.

In some embodiments, the sealing baffle plates are of annular structures. The bolts are circumferentially distributed on the sealing baffle plates.

Compared with the prior art, the present disclosure achieves the following technical effects.

In the present disclosure, pulse current is introduced into a plastic deformation area for drawing the high-strength metal allow thin-walled pipe, which effectively reduces the forming force of a material, reduce the work hardening rate, improves the metal plasticity, improves the formability of a high-strength metal, and solves the problem that the high-strength metal alloy thin-walled pipe is difficult to form. The high-strength metal alloy thin-walled pipe is subjected to multi-pass drawing by using electroplastic drawing, and annealing is not needed during the process, which improves the production efficiency. After the drawing is completed, fusible metal recovered during annealing is effectively recovered, which reduces the production cost and has higher economic efficiency. The cooling water circulation chamber is provided in the drawing die, which reduces the temperature of the die and is beneficial to improving the surface performance of the high-strength metal alloy thin-walled pipe and prolonging the service life of the die.

BRIEF DESCRIPTION OF THE DRAWINGS

To describe the technical solutions in the embodiments of the present disclosure or in the prior art more clearly, the following briefly describes the drawings required for describing the embodiments. Apparently, the drawings in the following description are merely some embodiments of the present disclosure, and those of ordinary skill in the art may still derive other drawings from these drawings without creative efforts.

Figure 1:
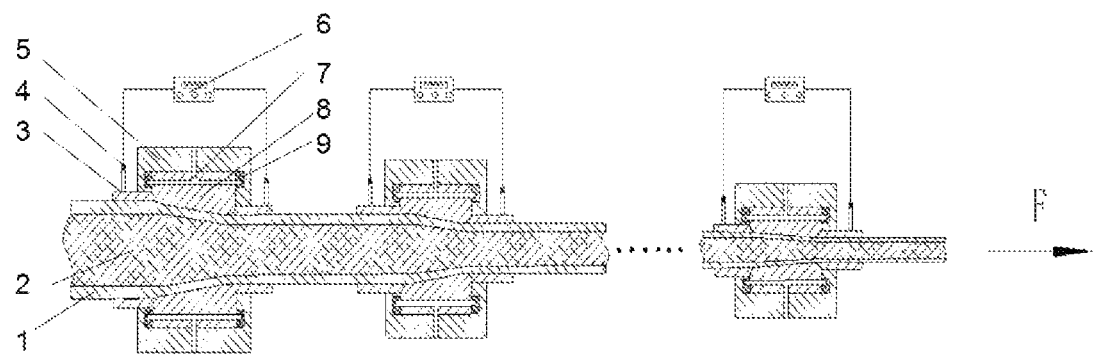
FIG. 1 is a schematic structural diagram of an electrically assisted forming device for a high-strength metal alloy thin-walled pipe of the present disclosure.

REFERENCE SIGNS IN THE DRAWINGS 1 high-strength metal alloy thin-walled pipe; 2 low-melting-point metal filler; 3 die sleeve; 4 wiring terminal; 5 die seat; 6 pulse power supply; 7 cooling water circulation chamber; 8 drawing die; 9 sealing baffle plate; 10 furnace wall; 11 high-strength metal alloy thin-walled pipe segment; 12 molten metal; and 13 groove.

DETAILED DESCRIPTION OF THE EMBODIMENTS

The technical solutions in the embodiments of the present disclosure will be clearly and completely described below with reference to the drawings in the embodiments of the present disclosure. It is apparent that the described embodiments are merely part of the embodiments of the present disclosure rather than all of the embodiments. On the basis of the embodiments of the present disclosure, all other embodiments obtained by those of ordinary skill in the art without creative work fall within the scope of protection of the present disclosure.

An objective of the present disclosure is to provide an electrically assisted forming process and device for a high-strength metal alloy thin-walled pipe to solve the above-mentioned problems in the prior art. The high-strength metal alloy thin-walled pipe is subjected to multi-pass drawing by using electro-plastic forming, which improve the production efficiency and solves the problem about the serious work hardening of the high-strength metal alloy thin-walled pipe. The production cost is effectively reduced by fusible metal recovered during annealing, so the economic efficiency is higher.

In order to make the above objective, features, and advantages of the present disclosure more apparent and more comprehensible, the present disclosure is further described in detail below with reference to the drawings and specific implementation manners.

Figure 2:
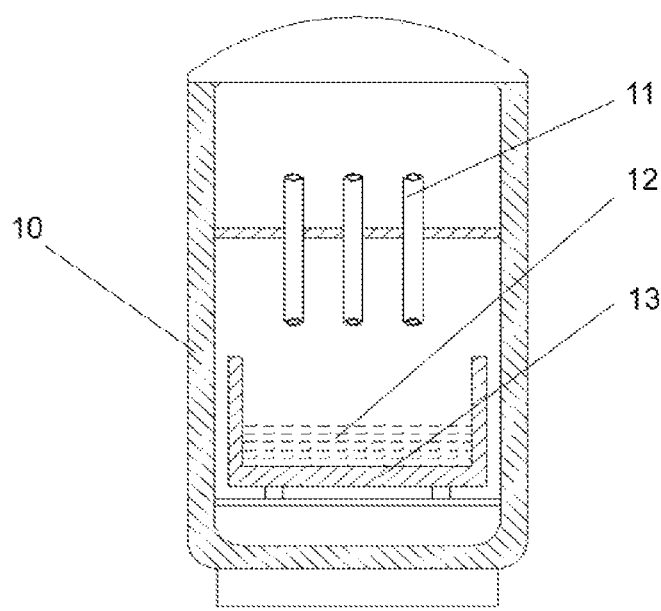
FIG. 2 is a schematic structural diagram of a vacuum heat treatment furnace of the present disclosure.

As shown in FIG. 1 and FIG. 2, the electrically assisted forming device for the high-strength metal alloy thin-walled pipe provided by the present disclosure is provided with a die sleeve 3, wiring terminals 4, a die seat 5, a pulse power supply 6, a cooling water circulation chamber 7, a drawing die 8, and sealing baffle plates 9 in sequence in the drawing direction. The die sleeve 3 includes a first die sleeve and a second die sleeve. Positive and negative wiring terminals 4 are respectively provided on the first die sleeve and the second die sleeve. The two wiring terminals 4 are respectively connected to a positive electrode and a negative electrode of the pulse power supply 6. The cooling water circulation chamber 7 is embedded into the die seat 5. The upper end of the cooling water circulation chamber 7 is communicated with a water inlet, and the lower end of the cooling water circulation chamber 7 is communicated with a water outlet. The water inlet and the water outlet of the cooling water circulation chamber 7 are externally connected to a circulating cold water tank, so as to form a closed cooling circulating system together. The sealing baffle plates 9 of annular structures are provided at two ends of the cooling water circulation chamber 7. The sealing baffle plates 9 are fixed to the drawing die 8 by bolts. The bolts are circumferentially distributed on the sealing baffle plates 9. A high-strength metal alloy pipe 1 is subjected to a horizontal rightward pulling force, so that the high-strength metal alloy pipe 1 is driven to be conveyed from left to right at a certain speed. After the drawing is completed, a high-strength metal alloy thin-walled pipe segment 11 with corresponding length is cut according to a production requirement and is subjected to annealing treatment in a vacuum heat treatment furnace. An aluminum rod in the high-strength metal alloy thin-walled pipe segment 11 is melted and flows into a groove 13 under the action of gravity, to form molten metal 12 for recycling and thereby a target high-strength metal alloy thin-walled pipe segment 11 is obtained.

Figure 3:
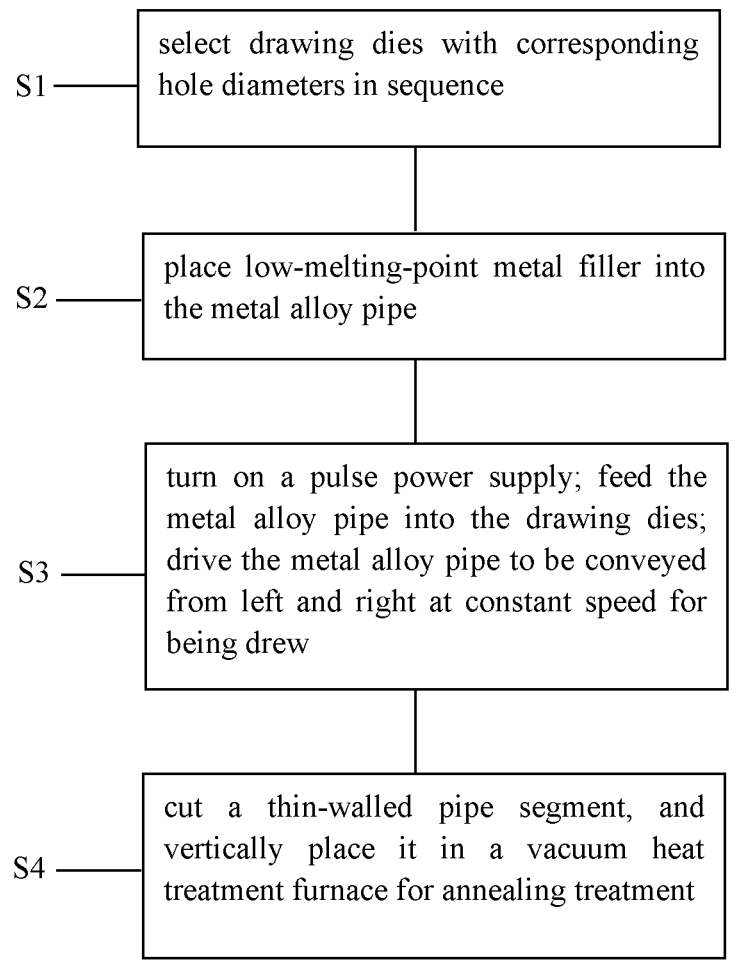
FIG. 3 is a flowchart illustrating an electrically assisted forming process for a metal alloy thin-walled pipe of the present disclosure.

Based on the abovementioned forming device, the present disclosure provides an electrically assisted forming process for a high-strength metal alloy thin-walled pipe as shown in the flowchart of FIG. 3, including the following steps.

In step S1, according to an outer diameter $\Phi_0$, of a high-strength metal alloy pipe to be drawn and an outer diameter $\Phi_{target}$ of a target high-strength metal alloy pipe, where $\Phi_{target}=\Phi_n$ (n>5), drawing dies with corresponding hole diameters are selected in sequence, i.e., the drawing dies with $\Phi_1$, $\Phi_2$, $\Phi_3$, . . . , $\Phi_n$ are selected.

In step S2, low-melting point metal filler 2 is placed into the high-strength metal alloy pipe to be drawn, where the low-melting point metal filler 2 is in clearance fit with the high-strength metal alloy pipe to be drawn, and a gap between the low-melting point metal filler 2 and the high-strength metal alloy pipe to be drawn is filled with graphite powder.

In step S3, a pulse power supply is turned on. The current magnitude, duty cycle, and frequency parameters of pulse power supply are set as required. The high-strength metal alloy pipe to be drawn is fed into the drawing die, the high-strength metal alloy pipe to be drawn is driven to be conveyed from left and right at constant speed, by a horizontal rightward pulling force, so as to experience an electroplastic drawing, where a cooling device is arranged between every two passes, the high-strength metal alloy pipe is drawn for more than 5 passes, the total processing rate of drawing is greater than 50%, the inner diameter is reduced by 20% to 70%, the outer diameter is reduced by 40% to 90%, and the wall thickness is thinned by 60% to 95%. The pulse power supply is turned off after the drawing is completed, and the high-strength metal alloy thin-walled pipe is obtained.

In step S4, the high-strength metal alloy thin-walled pipe segment with corresponding length is cut as required after the drawing is completed, and the cut high-strength metal alloy thin-wall pipe segment is vertically placed in a vacuum heat treatment furnace for annealing treatment. The vacuum heat treatment furnace includes a furnace wall 10. A groove 13 with an opening at its top is formed in the inner bottom of the furnace wall 10. A transverse frame is provided above the groove 13. The transverse frame is used for uniformly and vertically placing high-strength metal alloy thin-walled pipe segments to be subjected to annealing treatment. A low-melting-point metal filler 2 in the high-strength metal alloy thin-walled pipe segment is melted and flows into the groove 13 of the vacuum heat treatment furnace under the action of gravity, to form molten metal 12 for recycling, and thereby the target high-strength metal alloy thin-walled pipe segment is obtained.

Embodiment 1

An electrically assisted forming process for a high-strength metal alloy thin-walled pipe is used to prepare a 410-stainless steel thin-walled pipe. The 410-stainless steel thin-walled pipe with the outer diameter of 20 mm and the wall thickness of 4 mm is subjected to electroplastic drawing until the 410-stainless steel thin-walled pipe is drawn to a thin-walled pipe with the outer diameter of 10 mm and the wall thickness of 1 mm. A total of 12 passes of drawing are performed, and average diameters of the drawing dies of all passes are respectively $\Phi_1=19.5$ mm; $\Phi_2=19$ mm; $\Phi_3=18.5$ mm; $\Phi_4=18$ mm; $\Phi_5=17.4$ mm; $\Phi_6=16.8$ mm; $\Phi_7=16.1$ mm; $\Phi_8=15.3$ mm; $\Phi_9=14.5$ mm; $\Phi_{10}=13.5$ mm; $\Phi_{11}=12$ mm; and $\Phi_{12}=10$ mm. The total processing rate of drawing is 86%. Specific steps are as follows.

In step S1, according to an outer diameter $\Phi_0$ of a 410-stainless steel pipe to be drawn and an outer diameter $\Phi_{target}$ of a target 410-stainless steel pipe, where $\Phi_{target}=\Phi_{12}$, drawing dies with corresponding hole diameters are selected in sequence, i.e., the drawing dies with $\Phi_1$, $\Phi_2$, $\Phi_3$, . . . , $\Phi_{12}$ are selected.

In step S2, a fusible metal aluminum rod with the diameter of 10 mm is placed into the 410-stainless steel thin-walled pipe to be drawn, a gap between the aluminum rod and the inner wall of the metal pipe is filled with graphite powder, so that the interior of the whole steel pipe is fully filled.

In step S3, a pulse power supply is turned on, the duty cycle of the pulse power supply is set as 50%, the frequency of the pulse power supply is set as 300 HZ, and the output current of the pulse power supply is set as 100 A according to requirements. The 410-stainless steel pipe to be drawn is fed into the drawing die, and the 410-stainless steel pipe is subjected to a horizontal rightward pulling force, so that the 410-stainless steel pipe is conveyed from left to right at the speed of 50 mm/s, and experiences an electroplastic drawing. A cooling device is arranged between every two passes, and cooling water is introduced into a cooling water chamber of the cooling device. The pulse power supply is turned off after the drawing is completed.

In step S4, the 410-stainless steel thin-walled pipe segment with corresponding length is cut according to a production requirement after the drawing is completed. Moreover, due to the serious work hardening of the 410-stainless steel thin-walled pipe during drawing, the 410-stainless steel thin-walled pipe segment need to be subjected to annealing treatment, which is performed in a vacuum heat treatment furnace, at the vacuum annealing treatment temperature of 750° C., for the annealing time of 2 hours. Air cooling is performed after the annealing. During the annealing, the aluminum rod in the 410-stainless steel thin-walled pipe segment is melted, and flows into a groove under the action of gravity, for recycling, and thereby a target thin-walled pipe segment is obtained.

Embodiment 2

Different from the embodiment 1, the drawing object is a TC4 titanium alloy pipe, a magnesium alloy AZ31 is selected as a filler, and the drawn TC4 titanium alloy thin-walled pipe is directly annealed in a vacuum heat treatment furnace.

An electrically assisted forming process for a high-strength metal alloy thin-walled pipe is used to prepare a TC4 titanium alloy thin-walled pipe. The TC4 titanium alloy thin-walled pipe with the outer diameter of 30 mm and the wall thickness of 8 mm is subjected to electroplastic drawing until the TC4 titanium alloy thin-walled pipe is drawn to a thin-walled pipe with the outer diameter of 6 mm and the wall thickness of 0.8 mm. A total of 17 passes of drawing are performed, and average diameters of the drawing dies of all passes are respectively $\Phi_1=29$ mm; $\Phi_2=27$ mm; $\Phi_3=25$ mm; $\Phi_4=24.5$ mm; $\Phi_5=23.5$ mm; $\Phi_6=22$ mm; $\Phi_7=21$ mm; $\Phi_8=20$ mm; $\Phi_9=18.5$ mm; $\Phi_{10}=16$ mm; $\Phi_{11}=15$ mm; $\Phi_{12}=14$ mm; $\Phi_{13}=13.5$ mm; $\Phi_{14}=11$ mm; $\Phi_{15}=10$ mm; $\Phi_{16}=8.5$ mm; and $\Phi_{17}=8$ mm. Specific steps are as follows.

In step S1, according to the outer diameter $\Phi_0$ of a TC4 titanium alloy pipe to be drawn and the outer diameter $\Phi_{target}$ of a target TC4 titanium alloy pipe, where $\Phi_{target}=\Phi_{17}$, drawing dies with corresponding hole diameters are selected in sequence, i.e., the drawing dies with $\Phi_1$, $\Phi_2$, $\Phi_3$, ..., $\Phi_{17}$ are selected.

In step S2, an AZ31 magnesium alloy rod with the diameter of 12 mm is placed into the TC4 titanium alloy pipe to be drawn, a gap between the AZ31 magnesium alloy rod and the inner wall of the metal pipe is filled with graphite powder, so that the interior of the whole TC4 titanium alloy pipe is fully filled.

In step S3, a pulse power supply is turned on, the duty cycle of the pulse power supply is set as 40% to 70%, the frequency of the pulse power supply is set as 100 HZ to 600 HZ, and the output current of the pulse power supply is set as 80 A to 600 A according to requirements. The TC4 titanium alloy pipe to be drawn is fed into the drawing die. The TC4 titanium alloy pipe is subjected to a horizontal rightward pulling force in the drawing dies, so that the TC4 titanium alloy pipe is conveyed from left to right at the speed of 160 mm/s and experiences an electroplastic drawing. Where a cooling device is arranged between every two passes, and cooling water is introduced into a cooling water chamber of the cooling device. The pulse power supply is turned off after the drawing is completed.

In step S4, the TC4 titanium alloy thin-walled pipe segment with corresponding length is cut according to a production requirement after the drawing is completed, and the graphite powder is taken out by a tool or in a manner of knocking. Moreover, due to the serious work hardening of the TC4 titanium alloy thin-walled pipe during drawing, the TC4 titanium alloy thin-walled pipe segment need to be subjected to annealing treatment, which is performed in a vacuum heat treatment furnace, at the vacuum annealing treatment temperature of 800° C., for the annealing time of 1.5 hours. After the annealing, air cooling is performed. During the annealing, the aluminum rod in the TC4 titanium alloy thin-walled pipe segment is melted, and flows into a groove under the action of gravity for recycling, and thereby a target thin-walled pipe is obtained.

In the descriptions of the present disclosure, it should be noted that orientations or positional relationships indicated by the terms "center", "top", "bottom", "left", "right", "vertical", "horizontal", "inner", "outer" and the like are the orientations or positional relationships shown based on the accompanying drawings, and are merely for the convenience of describing the present disclosure and simplifying the description, rather than indicating or implying that the devices or elements must have particular orientations, and constructed and operated in particular orientations. Thus, it cannot be construed as a limitation to the present disclosure. In addition, terms "first" and "second" are merely used for description, and cannot be understood as indicating or implying relative importance.

In the present disclosure, specific examples are applied to illustrate the principle and implementation manner of the present disclosure. The description of the above embodiment is only used to help understand the method and core idea of the present disclosure. Moreover, for those of ordinary skill in the art, there will be changes in the specific implementation manner and scope of application according to the idea of the present disclosure. In conclusion, the content of the present description shall not be construed as a limitation to the present disclosure.

What is claimed is:

1. An electrically assisted forming process for a metal alloy thin-walled pipe, comprising:
   selecting drawing dies with corresponding hole diameters in sequence, according to an outer diameter $\Phi_0$ of a metal alloy pipe to be drawn and an outer diameter $\Phi_{target}$ of a target metal alloy pipe;
   placing low-melting-point metal filler into the metal alloy pipe to be drawn, wherein the low-melting-point metal filler is in clearance fit with the metal alloy pipe to be drawn, and a gap between the low-melting point metal filler and the metal alloy pipe to be drawn is filled with graphite powder;
   turning on a pulse power supply with predetermined current magnitude, duty cycle, and frequency; feeding the metal alloy pipe to be drawn into the drawing dies; driving, by a horizontal rightward pulling force, the metal alloy pipe to be drawn to be conveyed from left and right at constant speed such that the metal alloy pipe experiences an electroplastic drawing, a cooling device being arranged between every two passes; turning off the pulse power supply after drawing is completed to obtain a metal alloy thin-walled pipe; and
   cutting, from the metal alloy thin-walled pipe, a thin-walled pipe segment with corresponding length as required after the drawing is completed, and vertically placing the thin-wall pipe segment in a vacuum heat treatment furnace for annealing treatment, during which the low-melting-point metal filler in the thin-walled pipe segment is melted and flows into a groove of a vacuum heat treatment furnace under an action of gravity, for recycling and a target metal alloy thin-walled pipe is obtained.

2. The electrically assisted forming process for the metal alloy thin-walled pipe according to claim 1, wherein the duty cycle of the pulse power supply is 20% to 90%, the frequency is 100 HZ to 1000 HZ, and the current magnitude is 30 A to 1000 A.

3. The electrically assisted forming process for the metal alloy thin-walled pipe according to claim 1, wherein the annealing treatment is performed at a temperature of 300° C. to 900° C., for an annealing time of 0.5 to 5 hours, and air cooling is performed after the annealing treatment.

4. The electrically assisted forming process for the metal alloy thin-walled pipe according to claim 1, wherein the low-melting-point metal filler is pure aluminum or aluminum alloy.

5. The electrically assisted forming process for the metal alloy thin-walled pipe according to claim 1, wherein the vacuum heat treatment furnace comprises a furnace wall, a groove with an opening at its top is formed in an inner bottom of the furnace wall; a transverse frame is provided above the groove, and the transverse frame is used for uniformly and vertically placing the thin-walled pipe segment to be subjected to annealing treatment.

6. An electrically assisted forming device for a metal alloy thin-walled pipe, comprising a drawing die, wherein an inner diameter of the drawing die is gradually reduced from left to right, two ends of the drawing die are fixedly connected to die seats; the die seats comprise a first die seat and a second die seat; an inner diameter of the first die seat is same as the inner diameter of a left part of the drawing die; an inner diameter of the second die seat is same as the inner diameter of a right part of the drawing die; the first die seat and the second die seat are respectively connected to two wiring terminals; the two wiring terminals are respectively connected to a positive electrode and a negative electrode of a pulse power supply; the drawing die is externally covered with the die seats; two ends of the drawing die are respectively and fixedly connected to the first die seat and the second die seat; a cooling water circulation chamber is embedded into the die seats; sealing baffle plates are provided at two ends of cooling water circulation chamber, and are fixed to the drawing die by bolts.

7. The electrically assisted forming device for the metal alloy thin-walled pipe according to 6, wherein an upper end of the cooling water circulation chamber is connected to a water inlet passing through the die seats; a lower end of the cooling water circulation chamber is connected to a water outlet passing through the die seats; and water inlet and water outlet are respectively and externally connected to a circulating cold water tank.

8. The electrically assisted forming device for the metal alloy thin-walled pipe according to 6, wherein the sealing baffle plates are of annular structures; and the bolts are circumferentially distributed on the sealing baffle plates.

* * * * *